(12) United States Patent
Scordalakes et al.

(10) Patent No.: US 6,950,896 B2
(45) Date of Patent: Sep. 27, 2005

(54) HOT SWAP COMPACT PCI POWER SUPPLY

(75) Inventors: Nicholas Emmanuel Scordalakes, Costa Mesa, CA (US); Stephen Eugene Holness, Costa Mesa, CA (US)

(73) Assignee: Emulex Design & Manufacturing Corporation, Costa Mesa, CA (US)

(*) Notice: Subject to any disclaimer, the term of this patent is extended or adjusted under 35 U.S.C. 154(b) by 0 days.

(21) Appl. No.: 10/434,626

(22) Filed: May 9, 2003

(65) Prior Publication Data
US 2004/0225801 A1 Nov. 11, 2004

(51) Int. Cl.$^7$ .............................. G06F 13/00; G06F 1/26
(52) U.S. Cl. ...................... 710/301; 710/302; 713/300
(58) Field of Search .................. 710/100, 301, 710/302, 304, 104; 713/300, 330, 340

(56) References Cited

U.S. PATENT DOCUMENTS

| | | | |
|---|---|---|---|
| 5,636,347 A | * | 6/1997 | Muchnick et al. .......... 710/302 |
| 6,138,195 A | * | 10/2000 | Bermingham et al. ...... 710/104 |
| 6,400,203 B1 | | 6/2002 | Bezzi et al. |
| 6,425,027 B1 | | 7/2002 | Mills et al. |
| 6,525,515 B1 | | 2/2003 | Ngo et al. |
| 2002/0112191 A1 | | 8/2002 | Pelissier et al. |
| 2003/0084359 A1 | * | 5/2003 | Brensniker et al. |
| 2004/0004798 A1 | * | 1/2004 | Priest |
| 2004/0012263 A1 | * | 1/2004 | Hussein et al. |

FOREIGN PATENT DOCUMENTS

WO    WO 02/29586 A2    4/2002

* cited by examiner

*Primary Examiner*—Khanh Dang
(74) *Attorney, Agent, or Firm*—Morrison & Foerster LLP

(57) ABSTRACT

A two-step approach to power up a host bus adapter (HBA) or other adapter card during a live insertion is disclosed. A low power linear regulator provides early power while the system is in its reset state, then a FET is gradually turned on using a Hot Swap Controller to provide operational power to the HBA, at which time the linear regulator is disabled. The linear regulator provides early power to pre-charge the CompactPCI signal interface on the HBA and place the HBA CompactPCI drivers in tri-state while the HBA is held in reset.

38 Claims, 4 Drawing Sheets

HOT SWAP COMPACT PCI POWER SUPPLY

BACKGROUND OF THE INVENTION

1. Field of the Invention

The present invention relates, generally, to the controlled application of power to a circuit card during its insertion into a hot (powered) connector and, in one embodiment, to the two-step application of power to a Host Bus Adapter (HBA) card as it is connected to a powered Compact Peripheral Component Interconnect (CompactPCI) bus to minimize disturbances to the CompactPCI bus.

2. Description of Related Art

The Peripheral Component Interconnect (PCI) bus is a common and integral part of modern computer systems. However, PCI bus systems are not physically well-suited for environments that require zero downtime for reconfiguration or upgrades. The CompactPCI bus specification was developed to define a ruggedized version of the PCI bus for use in high reliability and availability systems. In a CompactPCI bus system, the bus is part of a powered backplane, and specialized circuit cards with staggered pins for the orderly application of power are coupled into the CompactPCI bus by insertion of the cards into slots on the backplane. One feature that the CompactPCI bus provides over a regular PCI bus is a Hot Swap feature, which is the ability to plug cards into and out of the backplane in a live (powered) environment without having to turn off system power. Hot Swap is a term and definition governed by the CompactPCI specification, PICMG 2.1, R2.0, Jan. 17, 2001, incorporated herein by reference.

The Hot Swap Compact PCI Specification defines a mechanical/electrical interface that enables HBAs to be installed in a hot (live) system without disturbing the operation of the system. The mechanical interface defines the HBA to the host backplane interface connector (CompactPCI connector). This CompactPCI connector provides three levels of pin staging which includes long, medium, and short pins. The long pins provide early power and ground, the medium pins provide additional power and ground and the signal interface, and the short pins provide the board select signals. There are two early power pins per supply voltage type. The electrical interface defines the maximum allowable input bulk capacitance (8.8 uF) seen by the early power pins and the maximum allowable inrush current per pin (1 A sustained, 2 A surge<100 us).

As illustrated in the exemplary diagram of FIG. 1, a CompactPCI bus 100 is typically part of a system which includes one or more processors or servers (CPU hosts) 102, main memory 104, Ethernet connections 106, bridges 108, adapter or interface cards 110, and the like. As with a regular PCI bus host, standard Windows NT and Linux software can run on a CompactPCI bus host. To implement Hot Swap capability, special circuitry is required in the hardware interface of the card, as well as system and card software drivers for cards that plug into the backplane. When a card is physically inserted or about to be extracted from a slot in the backplane, a latch on the card is closed or opened by an operator which triggers certain Hot Swap operations between the card and the host processor. These operations may load needed software drivers into host memory, or may delay the extraction of the card until all pending applications and transactions involving that card have been terminated.

There are a number of products currently being developed that implement a CompactPCI bus interface in adapter cards for peripheral buses and channels, such as a fibre channel network interface to be used in HBA designs for networking storage devices. Early CompactPCI bus interfaces coupled CompactPCI signals to an ASIC on the adapter card via FET switches ("quick switches") and 50 kΩ pullup resistors tied to a precharge voltage of 1V. A Hot Swap controller chip provided the precharge voltage, and when backend power was applied, the FET switches were turned on to couple the ASIC to the CompactPCI bus.

In later designs, the functionality of the quick switches was incorporated into the ASIC, and core logic within the ASIC was used to control and put the ASIC I/O into a tristate mode. FIG. 2 illustrates a CompactPCI HBA 200 in which a CompactPCI bus 202 connects directly to an adapter ASIC 204 and a Hot Swap Controller 214 through a CompactPCI connector 206, the ASIC 204 being powered by 3.3V power 228 and a switching regulator 208 and further connected to backend logic 210 for interfacing to a fibre channel bus 212.

The Hot Swap Controller 214 of FIG. 2 is designed to gradually turn on backend power to the board by turning on field-effect transistor (FET) 216 while limiting the amount of inrush current being drawn at any one time. Early power provided by the 3.3VEP pins 228 provided via the CompactPCI connector 206 is intended to directly power up the logic that interfaces to the CompactPCI backplane, in particular the Hot Swap Controller 214 and the ASIC 204.

Note that in FIG. 2, the FET 216 has two source terminals, 218 and 220, which can be thought of as two separate FETs. The source terminal 218 provides power to the backend logic 210, while the source terminal 220 provides a feedback (FB) signal 224 to the Hot Swap Controller 214. The Hot Swap Controller 214 will compare its 3.3V power input 222 to the FB power input 224. When the two inputs are approximately equal, a "gate" signal 226 will be generated, which gradually turns on the FET 216 to provide power to backend logic 210.

The CompactPCI connector 206 is the interface to the CompactPCI backplane (not shown), which carries CompactPCI signals such as power, data, and control signals. The CompactPCI connector 206 contains several pins that supply power and ground to the CompactPCI card 200, including early power and ground pins which are longer than the others. In CompactPCI, for example, the backplane provides 3.3V early power and 5V early power. As the CompactPCI card 200 is being inserted into the CompactPCI connector 206, the early power and ground pins mate first, providing early power to the ASIC I/O and placing the I/O in a tristate (high impedance) mode to isolate the ASIC from the operating bus and eliminate the possibility of the ASIC erroneously driving the bus while it is powered up.

Each ASIC I/O contains a pullup resistor (e.g. 50 kΩ) connected to a precharge voltage (typically 1V). A Hot Swap controller 214 is also powered up by early power, and provides the precharge voltage to the ASIC I/O. The precharge voltage precharges the input or output capacitance for that pin. With a 50 kΩ impedance charged to 1V, each I/O has very little charge delivering capability and thus will have little effect on the bus when connected.

As the CompactPCI card 200 continues to be inserted, the shorter pins, which include additional power pins and the remainder of the signal pins, eventually mate. The time between the mating of the early power and ground pins and the remainder of the pins varies, but is typically on the order of 4 milliseconds (mS). Because the ASIC I/O has already been precharged and placed in a tristate mode by this time, the mating of the ASIC I/O to the CompactPCI backplane causes little disturbance to the signals on the backplane.

The CompactPCI specification places certain restrictions on devices connected to early power. According to the CompactPCI specification, early power is limited to 1 A of steady current and 2 A for a short period of time. In addition, the CompactPCI specification limits the amount of capacitance that can be connected to early power to a maximum of 8.8 microfarads (uF), so as not to burn pins or cause excessive disturbances on the system power when the early power pins are first mated to the CompactPCI card 200. This limitation on capacitance is necessary because if the early power had to suddenly charge up a large amount of capacitance, the inrush current might cause such a disturbance or dip in the system power that the system could inadvertently reset or otherwise not operate properly.

In previous CompactPCI adapter cards, CompactPCI interface logic was implemented in discrete logic or bridge integrated circuits (ICs) on the adapter card, and other logic for interfacing with other networks, such as a fibre channel ASIC, for example, was connected to the bridge. Because the interface logic was separated from other functions, it generally drew less power and could be connected directly to the early power pins along with a small capacitor without exceeding the previously described restrictions defined in the CompactPCI specification. Alternatively, because the interface logic drew less power, a linear regulator receiving an input voltage from the early power pins could have been employed to power the interface logic.

However, because ASIC densities have improved, it is now desirable to incorporate more digital circuitry within the ASIC. Thus, in the example of FIG. 2, the ASIC 204 on a modern fibre channel CompactPCI HBA may preferably include CompactPCI interface logic, a fibre channel controller and other logic. Because such multifunction ASICs are larger, they require more total power. Although the I/O of these larger ASICs do not require significantly more power, the ASIC core logic may require much higher power, possibly drawing current in excess of 4 A.

In the example of FIG. 2, a switching regulator 208 is employed to convert 3.3V power to 1.8V, for example, which is needed to power the ASIC core logic. Switching regulators repeatedly turn on and off to generate a DC voltage, and are preferred because they dissipate less power than linear regulators. Because so much power is required, linear regulators are not practical because they are not as efficient and dissipate more power than switching regulators. Note that the high current drive of the switching regulator 208 is not needed to place the ASIC I/O in a tristate configuration while the card 200 is in reset mode, but it is needed when the ASIC 204 is released from reset mode. Thus, the switching regulator 208 must be capable of supporting the ASIC 204 in its operational mode.

However, one drawback to switching regulators is that they require large input and output capacitances to smooth out perturbations on the input and output signals caused by the switching of the regulators. As illustrated in the example of FIG. 2, if a switching regulator capable of providing 4 A of current for the ASIC core logic is to be used, its input would have to be connected directly to the 3.3V early power with an input capacitor (see reference designator 230) much larger than the 8.8 uF allowed by CompactPCI. Thus, the power supply circuitry in the CompactPCI HBA 200 in the example of FIG. 2 is not a practical solution.

As can be seen from the above discussion, the desire to utilize ASICs with increased functionality creates a need for more power, which in turn requires the use of a switching regulator. However, the switching regulator requires high input and output capacitance, which violates the CompactPCI specification. Thus, a need exists for a CompactPCI power supply design that is able to utilize early power to power ASIC I/O during initialization and is also able to provide high current for the ASIC core logic during normal operation, while conforming to the CompactPCI specification.

SUMMARY OF THE INVENTION

Embodiments of the present invention are directed to a two-step approach to power up a HBA or other adapter card. The invention recognizes the fact that the power required by HBAs when held in their reset state is a small percentage of the power required when they are in their operating state, and uses a two step approach to power up the HBA in order to meet the inrush current and input bulk capacitance requirements imposed by the Hot Swap Compact PCI Specification. A low power linear regulator provides early power while the system is in a reset state, then a FET is gradually turned on using a Hot Swap Controller to provide operational power to the HBA, at which time the linear regulator is disabled. The linear regulator provides early power to pre-charge the CompactPCI signal interface on the HBA and place the HBA CompactPCI drivers in tri-state while the HBA is held in reset.

In one embodiment, the linear regulator input is connected to the 5V power pins (5.0VEP, 5.0V) and provides the 3.3V main power supply (3.3V_MAIN) while the HBA is in reset. The maximum input bulk capacitance presented to the 5.0VEP pins is 4.7 uF. The Hot Swap Controller monitors a board select (BRD_SEL#) signal and a CompactPCI reset (CPCI_RST#) signal and gradually asserts a gate output when CPCI_RST# is deasserted and BRD_SEL# is asserted. The gate signal turns on the FET. One source terminal of the FET connects the HBA main power to the backplane 3.3V power and a second source terminal provides feedback to the Hot Swap Controller. When the feedback input (FB) to the Hot Swap Controller and the input voltage to the Hot Swap Controller are equal, the Hot Swap Controller asserts the power good output (PWR_GOOD#) and deasserts the local PCI reset (LPCI_RST#) signal. The assertion of the PWR_GOOD# signal disables the linear regulator and the desassertion of the LPCI_RST# signal releases the HBA from reset.

The input bulk capacitance is limited to that which is required by the linear regulator. The input bulk capacitance required by the linear regulator and its current limiting capability meet the requirements imposed by the Hot Swap Compact PCI Specification. A switching regulator is used to power up core logic in an ASIC that may contain CompactPCI interface logic, a fibre channel controller and other logic. The large amount of board bulk capacitance and input and output capacitance required by the switching regulator is isolated from CompactPCI connector and is pre-charged during reset by the linear regulator. The linear regulator provides inrush current limiting to minimize the disturbance to the Host power supply during hot (live) insertion.

This invention is applicable where a two-step power application is required due to hot insertion. One example would be the application of power to a redundant board (or any board) in a live system.

DETAILED DESCRIPTION OF PREFERRED EMBODIMENTS

In the following description of preferred embodiments, reference is made to the accompanying drawings, which form a part hereof, and in which is shown by way of illustration specific embodiments in which the invention may be practiced. It is to be understood that other embodiments may be utilized and structural changes may be made without departing from the scope of the preferred embodiments of the present invention.

Although embodiments of the present invention are primarily described herein in terms of a CompactPCI HBA, it should be understood that the invention is not limited to CompactPCI HBAs, but may be adapted to operate with other systems that allow powered insertion and extraction of circuit cards. In general, the power supply design of embodiments of the present invention provides a two-step approach to providing power to a card inserted during a live insertion, wherein caution must be taken to avoid disturbances to the power supply and signal lines.

Embodiments of the present invention provide a two-step approach to power up a HBA or other adapter card. In one embodiment, a linear regulator provides early power while the system is in its reset state, then a FET is gradually turned on to provide operational power to the HBA. The linear regulator provides early power to pre-charge the CompactPCI signal interface on the HBA and place the HBA CompactPCI drivers in tri-state while the HBA is held in reset. The input bulk capacitance is limited to the one required by the linear regulator. A switching regulator is used to power up core logic in an ASIC that may contain CompactPCI interface logic, a fibre channel controller and other logic. The large amount of board bulk capacitance and input and output capacitance required by the switching regulator is isolated from CompactPCI connector and is pre-charged during reset by the linear regulator. The linear regulator provides inrush current limiting to minimize the disturbance to the Host power supply during hot (live) insertion.

Figure 1:
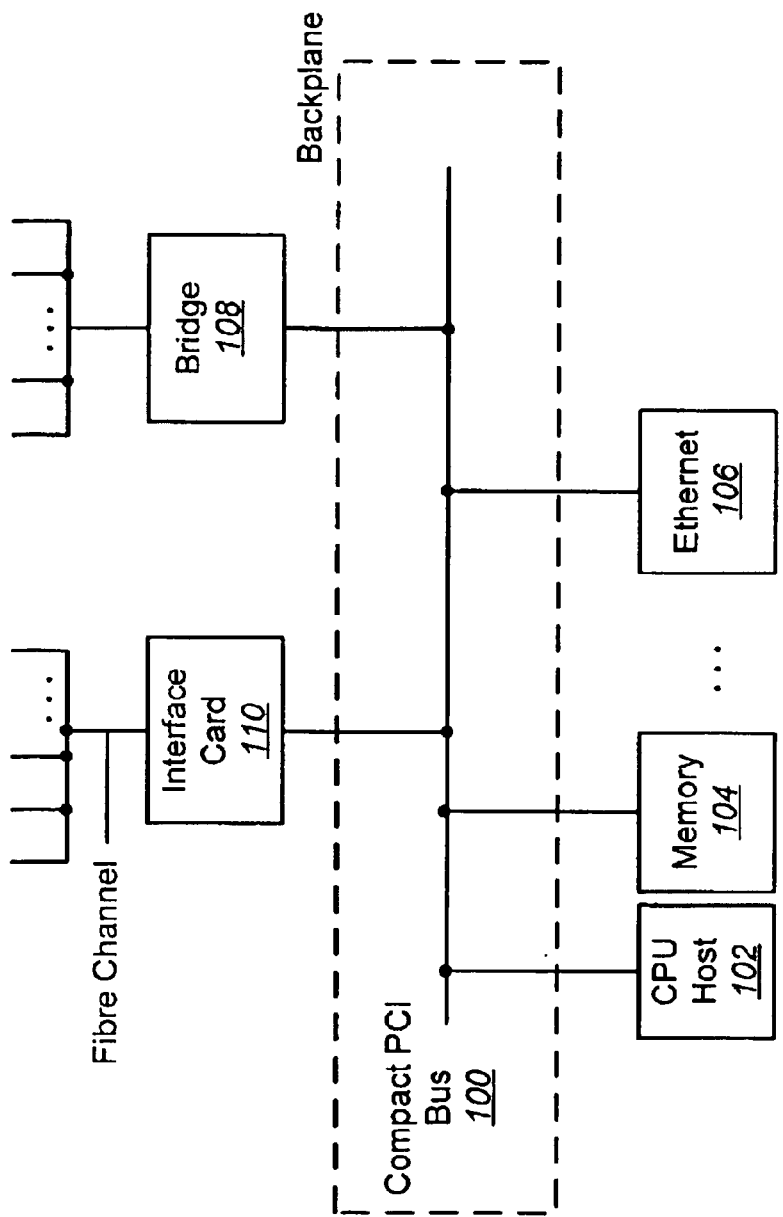
FIG. 1 is an exemplary block diagram illustrating a CompactPCI bus system.
Figure 2:
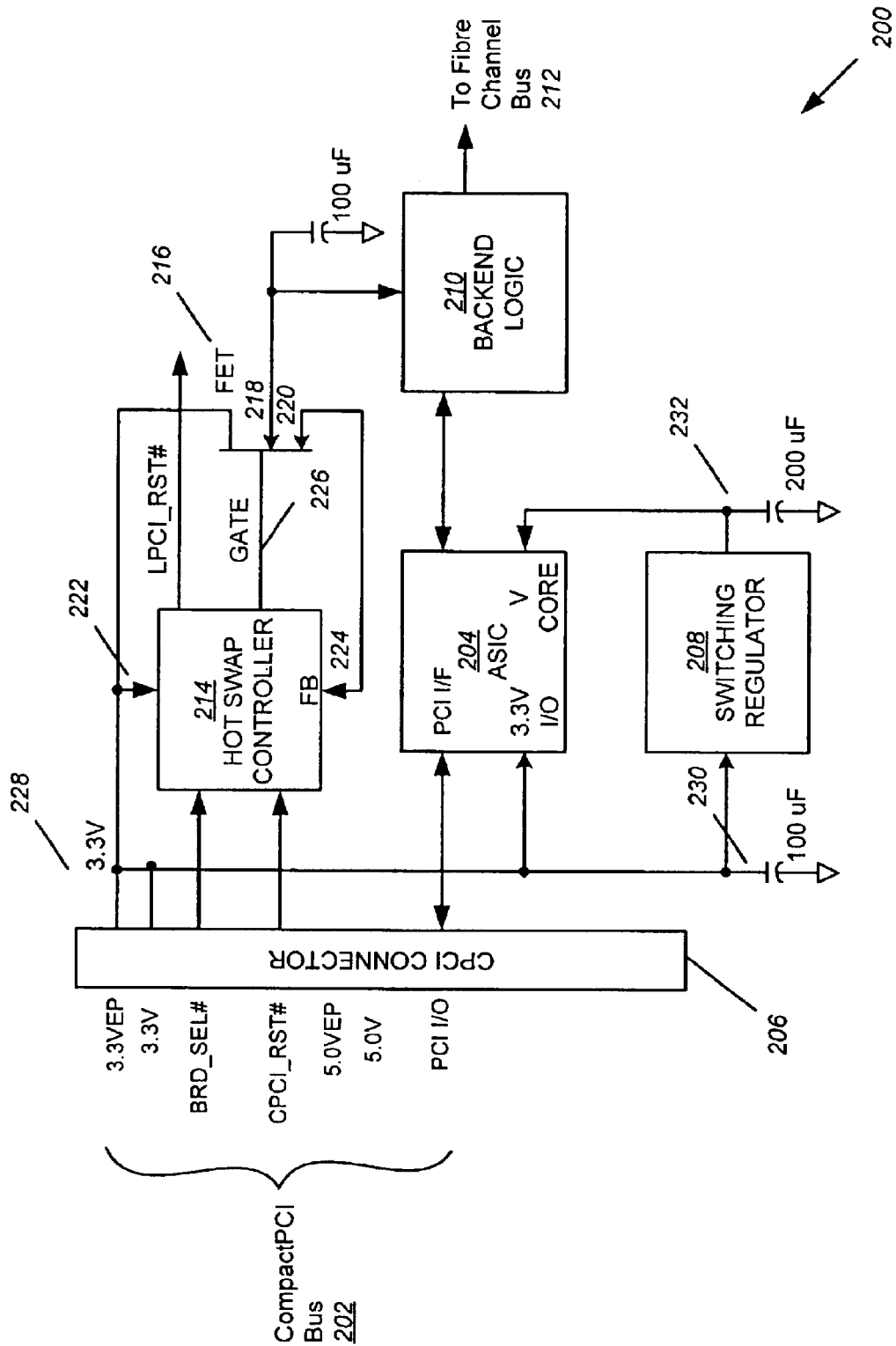
FIG. 2 is an exemplary block diagram illustrating a CompactPCI bus to fibre channel network HBA that does not comply with the CompactPCI specification.
Figure 3:
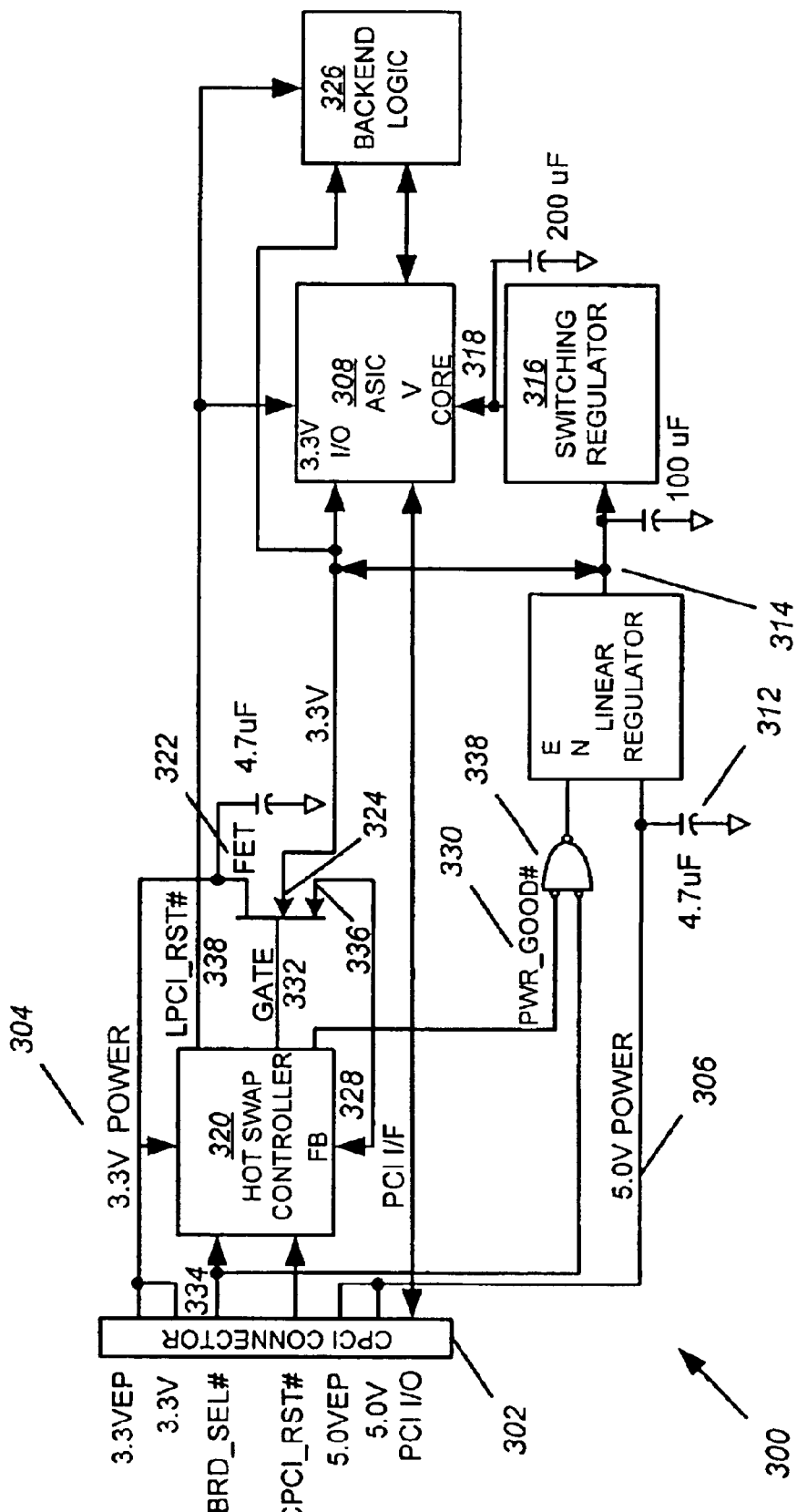
FIG. 3 is an exemplary block diagram illustrating a CompactPCI bus to fibre channel network HBA that complies with the CompactPCI specification according to embodiments of the present invention.

FIG. 3 is an exemplary block diagram illustrating a CompactPCI bus to fibre channel network HBA that complies with the CompactPCI specification according to embodiments of the present invention. When a CompactPCI card such as a HBA card 300 is first inserted into the CompactPCI connector 302, early power 304 is applied to a Hot Swap Controller 320, which also receives a deasserted board select signal BRD_SEL# 334 and an asserted CompactPCI reset signal CPCI_RST# from a host computer (not shown). The Hot Swap Controller 320 then asserts an LPCI_RST# signal 338, which holds all flip flops in ASIC 308 in a low power reset state (most power is dissipated when the flip flops are switching).

During this reset time, the ASIC 308 can be powered with a linear regulator 310. An input capacitance 312 of less than 8.8 uF (e.g. 4.7 uF) may be used on the input to the linear regulator 310, in compliance with the CompactPCI specification. During this reset phase, early power 306 (e.g. 5V) drives the linear regulator 310. The output 314 of the linear regulator 310, which may generate a DC voltage of 3.3V, for example, powers the I/O of the ASIC 308 and is input to switching regulator 316. The output 318 of switching regulator 316, which may generate a DC voltage of 1.8V, for example, powers the core logic of ASIC 308. The core logic may draw very little current (e.g. less than 0.5 A) during reset.

After a period of time, CPCI_RST# is deasserted by the host computer. When the card 300 is fully inserted into the CompactPCI connector 302 and an operator closes a latch on the card 300, the host computer asserts the BRD_SEL# signal 334 to activate the card 300. When Hot Swap Controller 320 receives an asserted BRD_SEL# signal 334, it asserts gate signal 332 which gradually turns on FET 322. As FET 322 turns on, it supplies power 304 (e.g. 3.3V) to the I/O of ASIC 308, backend logic 326 and switching regulator 316 via source terminal 324. Switching regulator 316 able to supply a larger amount of power (e.g. 4A) to the core logic of ASIC 408 than the linear regulator 310 during normal (non-reset) operation. FET 322 also asserts feedback (FB) input 328 (which is compared to input power 304 by Hot Swap Controller 320) via source terminal 336 until it reaches its approximate steady state (e.g. 3.3V), at which time the Hot Swap Controller 320 generates a PWR_GOOD# signal 330, indicating that FET 322 has been fully turned on providing power to the ASIC 308, switching regulator 316, and backend logic 326. The PWR_GOOD# signal 330 also shuts off the linear regulator 310 via gate 338 because the linear regulator is no longer needed once FET 322 is turned on providing power to the ASIC 308, switching regulator 316, and backend logic 326.

The basic purpose of the Hot Swap Controller 320 is to provide a gradual application of power to the card 300 without a large inrush current due to the circuitry on the card 300. Although a number of Hot Swap Controllers may be employed in the present invention, one example of a Hot Swap Controller is the LTC1646 by Linear Technology. It should be understood, however, that any Hot Swap Controller or other logic with functionality similar to the LTC1646 may be employed. Note that in the LTC1646 Hot Swap Controller specification, the FB input 328 is called 3VOUT. A preferred FET 322 is specified in the LTC1646 specification, but others with similar specifications could also be used.

The reason source terminals 324 and 336 on FET 322 are needed is that two independent outputs for 3.3V power 304 are needed (This could also be implemented as two separate FETs). The source terminal 324 that provides power to the I/O of ASIC 308 is also connected to the functioning linear regulator 314 at the time the FET 322 is turning on, so if source terminal 324 were also directly connected to the FB input 328, it would always read an in tolerance value (due to the functioning of linear regulator 310) and thus immediately trigger the assertion of PWR_GOOD# 330. By having a separate source terminal 336 for the FB input 328, PWR_GOOD# 330 will reach an in tolerance value only when the FET 322 is fully turned on.

It should be understood that the CompactPCI connector 302 has several power pins, all connected to the same power plane (e.g. 3.3V) in the backplane, but only the longer pins provide early power to the board. Once the card is fully inserted, all power pins are mated, and the power plane provides power to the card 300 through all power pins. In addition, note that in one embodiment of the present invention, the 5.0V power 306 is used only when the linear regulator 310 is enabled.

In alternative embodiments, other voltage sources such as DC-DC converters that present an input capacitance under 8.8 uF to the Host power supply and can supply temporary power during the reset state may be used in place of the linear regulator as a buffer between the Host power supply and the high input capacitance of the switching regulator.

Figure 4:
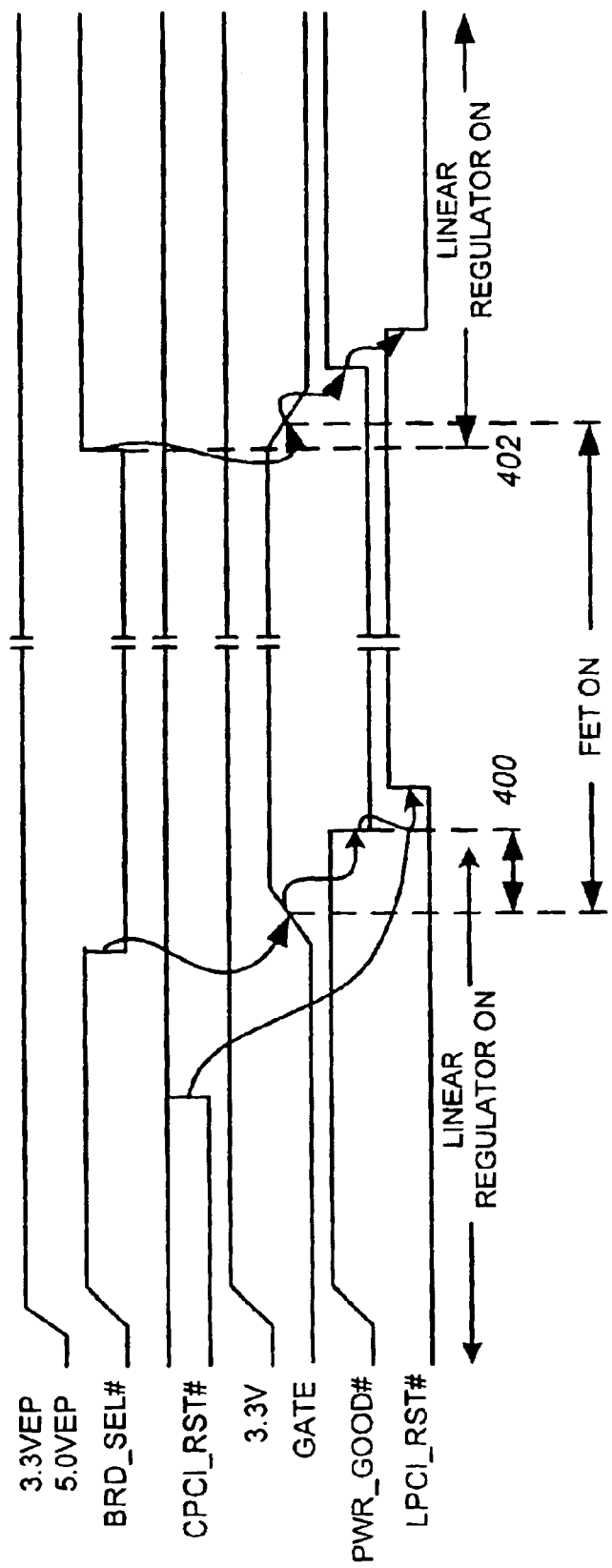
FIG. 4 is an exemplary timing diagram of the CompactPCI bus to fibre channel network HBA of FIG. 4 in both an insertion and extraction sequence according to embodiments of the present invention.

FIG. 4 is an exemplary timing diagram of the CompactPCI bus to fibre channel network HBA of FIG. 3 in both an insertion and extraction sequence according to embodiments of the present invention. At 400, there is a short period of time (less than 1 mS) when both the linear regulator and the FET are on and providing power (e.g. 3.3V), so there is some sharing of source current at that time. During the time when the linear regulator and the FET are on, there are two sources of power. If the voltage provided through the FET is slightly lower than the voltage from the linear regulator, the linear regulator will try to bring the voltage up. However, this situation should not be problematic because the voltage regulator has current limiting and the time period is short.

At 402, a power down sequence is illustrated. The BRD_SEL# signal is first deasserted by the host computer after unlatching of the card by an operator. This starts a sequence which brings the card into a reset state. When BRD_SEL# is deasserted, the gate signal goes low, which deasserts the PWR_GOOD# signal and turns off the FET, causing the ASIC to once again be in a reset state and powered by the linear regulator.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An apparatus for a controlled application of power to a circuit card while connecting the circuit card to a powered bus, the powered bus including early power and normal power, comprising:
   a temporary power source coupled to and supplied by the early power and including a first output for providing power to the circuit card during a reset time period of lower current draw when only the early power is connected to the circuit card, the reset time period beginning when the circuit card is first connected to the powered bus; and
   a primary power source coupled to and supplied by the first output of the temporary power source for providing power to the circuit card during the reset time, and also coupled to and supplied by the normal power for providing power to the circuit card during a normal operation time period of higher current draw when the normal power is connected to the circuit card and replaces the power provided by the temporary power source, the normal operation time period beginning near an end of the reset time period;
   wherein the temporary power source presents a low input capacitive load to the early power.

2. The apparatus as recited in claim 1, further comprising a hot swap controller for activating a flow of the normal power and deactivating the temporary power source upon detection of an end of the reset time period.

3. The apparatus as recited in claim 2, further comprising a FET controlled by the hot swap controller for activating the flow of the normal power.

4. The apparatus as recited in claim 1, wherein the temporary power source is a linear regulator.

5. The apparatus as recited in claim 1, wherein the primary power source is a switching regulator.

6. The apparatus as recited in claim 1, the circuit card further comprising input and output signals couplable to the powered bus;
   wherein the temporary power source pre-charges the input and output signals and places the input and output signals in a tri-state configuration during the reset time period.

7. A host bus adapter (HBA) comprising the apparatus of claim 1, the circuit card comprising a fibre channel controller circuit.

8. A server computer comprising the HBA of claim 7, wherein the powered bus is a CompactPCI bus, and further comprising a host CPU coupled to the CompactPCI bus.

9. A storage area network (SAN) comprising the server computer of claim 8, wherein a fibre channel network is coupled to the fibre channel controller circuit and one or more storage devices are to the fibre channel network.

10. A host bus adapter (HBA) comprising the apparatus of claim 1, the circuit card further comprising a storage network controller circuit.

11. A server computer comprising the HBA of claim 10, wherein the powered bus is a CompactPCI bus, and further comprising a host CPU coupled to the CompactPCI bus.

12. A storage area network (SAN) comprising the server computer of claim 11, wherein a storage network is coupled to the storage network controller circuit and one or more storage devices are coupled to the storage network.

13. An apparatus for a controlled application of power to a circuit card while connecting the circuit card to a powered CompactPCI bus, the powered CompactPCI bus including early power and normal power, comprising:
   a low power linear regulator coupled to and supplied by the early power and including a first output for providing power to the circuit card while the circuit card is in a low power reset state, the low power linear regulator presenting a low input capacitance load to the early power;
   a high power switching regulator coupled to and supplied by the first output of the low power linear regulator for providing power to the circuit card during the low power reset state, and also coupled to and supplied by the normal power for providing power to the circuit card while the circuit card is in a high power normal operation state; and
   a hot swap controller for activating a flow of the normal power to the high power switching regulator, beginning the high power normal operation state, and deactivating the low power linear regulator upon detection of an end of the low power reset state.

14. The apparatus as recited in claim 13, further comprising a FET controlled by the hot swap controller for activating the flow of the normal power.

15. The apparatus as recited in claim 13, the circuit card further comprising input and output signals couplable to the powered bus;
   wherein the low power linear regulator pre-charges the input and output signals and places the input and output signals in a tri-state configuration during the low power reset state.

16. A method for controlling an application of power to a circuit card while connecting the circuit card to a powered bus, the powered bus including early power and normal power, comprising:
   deriving temporary power from the early power and presenting a low input capacitance load to the early power;
   providing the temporary power to the circuit card during a reset time period of lower current draw when only the early power is connected to the circuit card, the reset time period beginning when the circuit card is first connected to the powered bus;
   deriving primary power from the temporary power and providing the primary power to the circuit card during the reset time period, and
   deriving the primary power from the normal power and providing the primary power to the circuit card during a normal operation time period of higher current draw when the normal power is connected to the circuit card and replaces the temporary power, the normal operation time period beginning near an end of the reset time period.

17. The method as recited in claim 16, further comprising activating a flow of the normal power and deactivating the temporary power upon detection of an end of the reset time period.

18. The method as recited in claim 17, further comprising controlling a FET to activate the flow of the normal power.

19. The method as recited in claim 16, further comprising providing the temporary power using linear voltage regulation.

20. The method as recited in claim 16, further comprising providing the primary power using switching voltage regulation.

21. The method as recited in claim 16, further comprising charging input and output signals couplable to the powered bus using temporary power and placing the input and output signals in a tri-state configuration during the reset time period.

22. The method as recited in claim 16, further comprising controlling a fibre channel network with the circuit card.

23. The method as recited in claim 22, further comprising coupling a host CPU in a serve computer to the circuit card via a CompactPCI bus.

24. The method as recited in claim 16, further comprising controlling a storage area network (SAN) with the circuit card.

25. A method for a controlled application of power to a circuit card while connecting the circuit card to a powered CompactPCI bus, the powered CompactPCI bus including early power and normal power, comprising:

providing power to the circuit card while the circuit card is in a low power reset state using low power linear voltage regulation supplied by the early power, and presenting a low input capacitance load to the early power;

providing power to the circuit card while the circuit card is in the low power reset state using high power switching voltage regulation supplied by the low power linear regulation, and also while the circuit card is in a high power normal operation state using high power switching voltage regulation supplied by the normal power; and activating a flow of the normal power, beginning the high power normal operation state, replacing the power provided by the low power linear regulation with the power provided by the high power switching voltage regulation and deactivating the low power linear voltage regulation upon detection of an end of the low power reset state.

26. The method as recited in claim 25, further comprising controlling a FET to activate the flow of the normal power.

27. The method as recited in claim 25, comprising precharging input and output signals couplable to the powered bus using the low power linear voltage regulation and placing the input and output signals in a tri-state configuration during the low power reset state.

28. An apparatus for a controlled application of power to a circuit card while connecting the circuit card to a powered bus, the powered bus including early power and normal power, comprising:

a primary power source supplied by the normal power for providing power to the circuit card during normal operation; and a temporary power source coupled to and supplied by the early power for providing power to the circuit card during a reset time period prior to the normal operation, and coupled to the primary power source for providing power to the primary power source and for providing a buffer between the powered bus and the primary power source to limit an input capacitance seen by the powered bus during the reset time period, the reset time period beginning when the circuit card is first connected to the powered bus.

29. The apparatus as recited in claim 28, further comprising a hot swap controller for activating a flow of the normal power and deactivating the temporary power source upon detection of an end of the reset time period.

30. A host bus adapter (HBA) comprising the apparatus of claim 28, the circuit card further comprising a fibre channel controller circuit.

31. A server computer comprising the HBA of claim 30, wherein the powered bus is a CompactPCI bus, and further comprising a host CPU coupled to the CompactPCI bus.

32. A storage area network (SAN) comprising the server computer of claim 31, wherein a fibre channel network is coupled to the fibre channel controller circuit and one or more storage devices are coupled to the fibre channel network.

33. A host bus adapter (HBA) comprising the apparatus of claim 28, the circuit card further comprising a storage network controller circuit.

34. A server computer comprising the HBA of claim 33, wherein the powered bus is a CompactPCI bus, and further comprising a host CPU coupled to the CompactPCI bus.

35. A storage area network (SAN) comprising the server computer of claim 34, wherein a storage network is coupled to the storage network controller circuit and one or more storage devices are coupled to the storage network.

36. An method for controlling an application of power to a circuit card while connecting the circuit card to a powered bus, the powered bus including early power and normal power, comprising:

deriving primary power from the normal power for providing power to the circuit card during normal operation; and isolating the primary power from the powered bus with temporary power derived from the early power during a reset time period prior to the normal operation, the temporary power for limiting an input capacitance seen by the powered bus and for providing power to the circuit card during the reset time period, the reset time period beginning when the circuit card is first connected to the powered bus.

37. The method as recited in claim 36, wherein the primary power is also derived from the temporary power during the reset time period for providing power to the circuit card.

38. The method as recited in claim 36, further comprising activating a flow of the normal power and deactivating the temporary power upon detection of an end of the reset time period.

* * * * *